UNITED STATES PATENT OFFICE 2,492,661

METALATION OF HALOGENATED THIOPHENES

John W. Schick, Camden, N. J., assignor to Socony-Vacuum Oil Company, Incorporated, a corporation of New York No Drawing. Application December 24, 1946, Serial No. 718,271

25 Claims. (Cl. 260—329)

This invention relates to a method for metalating halogenated thiophenes and to the products obtained as a result of said metalation.

One method of preparing inorganic salts is by the interaction of an acid with a metal. In a similar manner, salts can be prepared from the action of a metal on an organic compound containing one or more acidic hydrogen atoms. Such reactions involving replacement of an acidic hydrogen by a metal atom to yield an organometallic compound illustrate transformations generally referred to as metalation.

In reactions between an organic halide and a highly reactive metal, such as sodium, the halogen atom is ordinarily removed from the organic molecule and replaced either by a sodium atom or by an organic radical. In the latter instance a coupling reaction between two of the organic halide molecules takes place at the halogen linkage with removal of the halogen atoms from each molecule, said halogen atoms combining with metal atoms present to form a salt. Thus, these two general types of reactions may be designated by the following equations:

(1) 
(2) 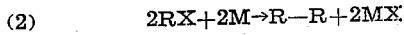

The latter reaction, known as the Wurtz-Fittig reaction, is a well-recognized method of synthesizing organic compounds and has in the past been the subject of extensive experimental investigation.

Reactions between halogenated heterocyclic compounds and alkali metals have heretofore been noted and were found to follow the general Equation 1 set forth above. That is, the halogen atom attached to the heterocyclic ring was replaced by a metal atom to yield an organometallic compound.

It has now been discovered that halogenated thiophene compounds containing at least one alpha hydrogen atom, when reacted with sodium under particular conditions hereinafter described in detail, give rise to halogenated thienyl-sodium compounds. In other words, metallic sodium, instead of replacing the halogen atom on the thiophene ring as ordinarily would be expected, undergoes an unusual and unexpected substitution reaction with replacement of a hydrogen atom to yield a thiophene ring having as substituents attached thereto a halogen and a sodium atom. The resulting compound, having an electropositive and an electronegative group linked to the same thiophene ring is extremely useful as an intermediate in the synthesis of derivatives of thiophene which, in turn, find use in the manufacture of plastics, pharmaceuticals, insecticides, dyes, addition agents for petroleum fractions, odorants, synthetic lubricants, waxes, extreme pressure additives for mineral oils and anti-foaming agents. The halogenated thienylsodium compounds produced in accordance with the method of this invention may thus be subjected to sulfonation, carbonation, halogenation, acylation, alkylation, hydrogenation, nitration, etc., to yield useful derivatives of thiophene. The compounds may also be coupled or condensed with other molecules, be reacted with various other metals and, in general, undergo a multitude of reactions which will be recognized by those skilled in the art.

In accordance with the process of this invention, halogenated thienyl-sodium compounds are prepared by the interaction of sodium with a halogenated thiophene compound containing a hydrogen atom in at least one of the alpha positions, that is, a hydrogen atom attached to one of the carbon atoms adjacent to the sulfur atom in the thiophene ring. The compounds to be metalated by the method described herein will accordingly contain a hydrogen atom in either, or both, the 2 and 5 position of the thiophene ring. The halogen atom of the compound may occupy the remaining alpha position or may be substituted in either of the beta positions. The thiophene compound may also contain more than one halogen substituent which may either be the same or a different member of the halogen family. Also, the thiophene ring may have one or two of its nuclear hydrogen atoms replaced by alkyl radicals, it being essential, however, for purposes of the present invention, that the thiophene reactant contain at least one halogen substituent and at least one alpha hydrogen atom. The reaction contemplated by this invention may thus be designated by the following general equation:

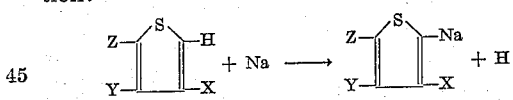

where at least one of the substituents X, Y, and Z is a halogen atom and the two remaining substituents are either alkyl radicals, hydrogen or halogen atoms. Thus, the present invention contemplates the metalation of compounds such as 2-chlorothiophene, 3-chlorothiophene, 2,3-dichlorothiophene, 3,4-dichlorothiophene, 2,4-dichlorothiophene, 2,3,4 - trichlorothiophene; 2-bromothiophene, 3 - bromothiophene, 2,3 - dibromothiophene, 3,4-dibromothiophene, 2,4-dibromothiophene, 2,3,4-tribromothiophene; 2-iodothiophene, 3-iodothiophene, 2,3-di-iodothiophene, 2,4-di-iodothiophene, 3,4-di-iodothiophene, 2,3,4-tri-iodothiophene; 2-chloro-3-bromothiophene; 3-chloro-4-bromothiophene; 2-chloro-4-bromothiophene; 2,3-dichloro-4-bromothiophene; 2,4-dichloro-3-bromothiophene; 2-chloro-3-iodo-4-bromothiophene; 2-bromo-3-iodothiophene; 2-chloro-3-methylthiophene; 2-ethyl-4-bromothiophene; 3-methyl-4-iodothiophene; 2,3-dimethyl-4-chlorothiophene; 2-bromo-3-methyl-4-ethyl-thiophene, etc.

It has been found that by carrying out the above reaction in an inert atmosphere and in the presence of an ethereal solvent, an acidic alpha hydrogen atom of the halogenated thiophene is replaced by a sodium atom to yield a new composition of matter, namely, a halothienylsodium. This unexpected reaction appears to be intimately connected with the use of an ethereal solvent in which the ratio of carbon to oxygen is not greater than about four to one. Thus, when the reaction was carried out under identical conditions, using an ethereal solvent having a carbon to oxygen ratio greater than the above or using an inert hydrocarbon solvent such as benzene, toluene, hexane and the like, the unexpected results obtained in accordance with the present method were not encountered.

The solvent to be employed herein in effecting metalation of the halogenated thiophene compound accordingly is an organic ether characterized by the presence of the linkage

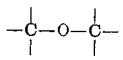

and containing not more than four carbon atoms per atom of oxygen. Suitable ethereal solvents which may be employed include diethyl ether, dimethyl ether, methyl ethyl ether, dimethyl ether of ethylene glycol, and the dimethyl ethers of polyethylene glycols. Of this group, the normally liquid compounds are to be preferred and, in particular, diethyl ether.

The unique metalation reaction of the present invention appears to be confined to the use of sodium as the metalating agent. Sodium may be introduced into the reaction mixture as metallic sodium, or in the form of an alloy containing sodium in substantial proportion, preferably as its major component. In general, it may be stated that the reaction rate, and consequently the yield of desired product obtained in a given time, is dependent on the particle size of the sodium employed for the metalation. As a rule, the smaller the particle size of sodium used, the faster was the rate of reaction. Accordingly, finely divided sodium, such as sodium shot or sodium sand, is to be preferred for use in the present process. A convenient method of preparing finely divided sodium for use in the present invention comprised melting the sodium at the reflux temperature of anhydrous toluene in an atmosphere of nitrogen and then cooling rapidly with high speed stirring. The toluene was then replaced with the ethereal solvent employed, and the sodium particles so obtained were used in effecting metalation. Likewise, any other means of finely dividing the sodium metal may be employed.

Due to the high reactivity of sodium and the resultant halothienylsodium, it is essential to exclude moisture and air from the reaction zone and to carry out the process of this invention in an inert atmosphere, such as nitrogen or other of the inert gases. If the ethereal solvent employed is one of low boiling point, such as diethyl ether, the vapor of said solvent may provide the inert atmosphere under which the reaction takes place.

The temperature at which the reaction of sodium and halogenated thiophene compounds is carried out, in accordance with this invention, will generally be between about −10° C. and about 50° C. Usually at temperatures below −10° C. the reaction is sluggish so that little or no metalation takes place, while at temperatures above about 50° C. there is a tendency for the halogenated thiophene reactant to lose its halogen substituents, thus interfering with the desired course of the reaction. Also, at higher temperatures, as the melting point of sodium is approached, fusion of the metal occurs, drastically reducing the yield of desired product. The preferred temperature range appears to be between about 20° C. and about 40° C. The reaction may, if desired, be carried out under pressure, although ordinarily the process proceeds readily at atmospheric pressure. Usually when a pressure is employed, it will be sufficient to maintain the reactants in liquid phase, and this will be dependent on the particular temperature involved. It will, of course, be understood that these reaction variables are more or less interdependent.

The following detailed examples will serve to illustrate the method of metalating halogenated thiophenes in accordance with the present invention:

Example 1

A mixture of 29.5 grams (0.25 mole) of 2-chlorothiophene and 200 milliliters of anhydrous diethyl ether was slowly added, at a reflux temperature of about 40° C. over a period of 2 hours, to 13.75 grams (0.6 gram atom) of freshly prepared sodium shot. The reaction was carried out in an atmosphere of nitrogen. The surfaces of the sodium shot darkened immediately and in a short time the ether solution acquired a grayish cast. After the addition was completed, the reaction mixture was refluxed for an additional hour and then cooled to 25° C. with an ice bath. The product resulting from said reaction was identified as 5-chloro-2-thienylsodium.

Such identification was effected by carbonating the product by addition thereto of small pieces of freshly crushed Dry Ice. The temperature rose immediately but was kept below 30° C. until carbonation was completed. Forty milliliters of ethanol were then added dropwise to destroy the unreacted sodium and then 200 milliliters of distilled water were added cautiously. The resulting aqueous layer was separated and acidified with 70 milliliters of concentrated hydrochloric acid. A voluminous yellow precipitate settled out of solution and, upon drying, weighed 27 grams (63% yield). The precipitate, upon recrystallization from hot water, yielded white needle-like crystals having a melting point of 151–152° C. and a neutral equivalent of 163. The calculated neutral equivalent for 5-chloro-2-thiophenecarboxylic acid was 163. A mixed melting point of the product with an authentic sample of 5-chloro-2-thiophenecarboxylic acid gave no depression.

Example 2

A mixture of 118 grams (1 mole) of 2-chlorothiophene and 700 milliliters of anhydrous diethyl ether was slowly added, at a reflux temperature of about 40° C. over a period of 4 hours, to 35 grams (1.5 gram atom) of freshly prepared sodium shot and 300 milliliters of anhydrous diethyl ether. The surfaces of the sodium shot darkened immediately and in a short time the ether solution acquired a grayish cast. After the addition was completed, the reaction mixture was refluxed for an additional 2 hours, after which it was cooled to 25° C. The product resulting from said reaction was identified as 5-chloro-2-thienylsodium.

Such identification was effected as in Example 1 by carbonating the product by the addition thereto of freshly crushed Dry Ice. The temperature rose as the carbonation proceeded but was kept below 30° C. The temperature fell rapidly when carbonation was completed. One hundred milliliters of ethanol were then added to destroy the unreacted sodium, after which 350 milliliters of distilled water were cautiously added. The aqueous solution was separated and acidified with 230 milliliters of concentrated hydrochloric acid to yield 115 grams (70% yield) of a product which was identified as 5-chloro-2-thiophenecarboxylic acid.

*Example 3*

A mixture of 41 grams (0.25 mole) of 2-bromothiopene and 200 milliters of anhydrous diethyl ether was slowly added, at a reflux temperature of about 40° C. over a period of about 2 hours, to 13.5 grams (0.59 gram atom) of freshly prepared sodium shot and 100 milliliters of anhydrous diethyl ether. The reaction was carried out in an atmosphere of nitrogen. The surfaces of the sodium darkened immediately and the ether solution acquired a gray-black cast. After the addition was completed, the reaction mixture was refluxed for an additional hour, after which it was cooled to 25° C. The product resulting from said reaction was identified as 5-bromo-2-thienylsodium.

Said identification was effected by carbonating the product by the addition thereto of freshly crushed Dry Ice. The temperature rose rapidly but was kept below 30° C. The completion of the carbonation was noted by the sudden drop in temperature. Fifty milliliters of ethanol were added to destroy unreacted sodium and then 200 milliliters of distilled water were cautiously added. The aqueous layer was separated and acidified with 70 milliliters of concentrated hydrochloric acid. A red oil separated which crystallized, on cooling, to give 18 grams (35% yield) of crude 5-bromo-2-thiophenecarboxylic acid. White needle-like crystals were obtained by sublimation of the crude product. The crystals so obtained had a melting point of 134.5–135.5° C. and a neutral equivalent of 202. The calculated neutral equivalent for 5-bromo-2-thiophenecarboxylic acid was 207.

*Example 4*

A mixture of 55 grams (0.25 mole) of 2-iodothiophene and 200 milliliters of anhydrous diethyl ether was slowly added, at a reflux temperature of about 40° C. over a period of 45 minutes, to 9 grams (0.38 gram atom) of freshly prepared sodium shot. The solution acquired a bluish color which became more predominant as the reaction proceeded. After the addition was completed, the reaction mixture was refluxed for an additional 1¾ hours and then cooled to 20° C. with an ice bath. The product resulting from said reaction was identified as 5-iodo-2-thienylsodium.

Said identification was effected by carbonating the product by the addition thereto of freshly crushed Dry Ice. The temperature rose momentarily but was kept below 30° C. Thirty milliliters of ethanol were slowly added to destroy the unreacted sodium and then 200 milliliters of distilled water were added cautiously. The resultant aqueous layer was separated and acidified with 50 milliliters of concentrated hydrochloric acid. A red oil separated from the solution which crystallized, on cooling, to yield 21 grams (33% yield) of crude 5-iodo-2-thiophenecarboxylic acid. White needle-like crystals were obtained when the crude product was sublimed. These crystals had a melting point of 132.5–133.5° C. and a neutral equivalent of 250. The calculated neutral equivalent for 5-iodo-2-thiophenecarboxylic acid was 253.

*Example 5*

A mixture of 29.5 grams (0.25 mole) of 2-chlorothiophene and 200 milliliters of anhydrous diethyl ether was added dropwise at 0° C., over a period of 1 hour, to a stirred suspension of 100 milliliters of anhydrous diethyl ether and sodium amalgam sand containing 9 grams (0.39 gram atom) of sodium and 3 grams (0.015 gram atom) of mercury. After the addition was completed, the reaction mixture was stirred for an additional 2½ hours. The product resulting from said reaction was identified as 5-chloro-2-thienylsodium. Such identification was effected by carbonating the reaction mixture with small pieces of freshly crushed Dry Ice. Unreacted sodium was destroyed with 40 milliliters of ethanol, and then 150 milliliters of distilled water were added cautiously. The resulting aqueous layer was separated and acidified with 70 milliliters of concentrated hydrochloric acid. A very light-brown precipitate of 5-chloro-2-thiophenecarboxylic acid settled from solution, was filtered off, and found to weigh 6.5 grams. The melting point of this crude product was 145–146° C.

*Example 6*

A mixture of 118 grams (1 mole) of 2-chlorothiopene and 700 milliliters of anhydrous diethyl ether was added slowly, at a reflux temperature of about 48° C., over a period of 2 hours, to 55 grams of sodium amalgam sand containing 35 grams (1.5 gram atoms) of sodium and 25 grams (0.125 gram atom) of mercury and 300 milliliters of anhydrous diethyl ether. After the addition was completed, the reaction mixture was refluxed for an additional 2 hours, after which it was cooled at 25° C. The product resulting from said reaction was identified as 5-chloro-2-thienylsodium. Such identification was effected as in the preceding examples by carbonating the product by the addition thereto of freshly crushed Dry Ice to yield 150 grams (92% yield) of a product which was identified as 5-chloro-2-thiophenecarboxylic acid.

*Example 7*

A mixture of 177 grams (1.5 moles) of 2-chlorothiopene and 750 milliliters of anhydrous diethyl ether was added rapidly to freshly prepared sodium amalgam sand containing 35 grams (1.5 gram atoms) of sodium and 20 grams (0.10 gram atom) of mercury. The reaction became vigorous upon said addition and periodic cooling was required for about one hour. When the reaction had subsided, the mixture was warmed to a reflux temperature of about 40° C. for an additional 2 hours, after which it was cooled. The product resulting from said reaction was identified as 5-chloro-2-thienylsodium.

Such identification was effected by carbonating the product by the addition thereto of small pieces of freshly crushed Dry Ice, keeping the temperature below 30° C. until carbonation was completed. Six hundred milliliters of distilled water were then cautiously added. The resulting aqueous layer was separated and acidified with 170 milliliters of concentrated hydrochloric acid to yield 180 grams (74% yield) of a product which was identified as 5-chloro-2-thiophenecarboxylic acid.

*Example 8*

A mixture of 236 grams (2 moles) of 2-chlorothiophene and 500 milliliters of anhydrous diethyl ether was added rapidly to freshly prepared sodium amalgam sand containing 50 grams (2.17 gram atoms) of sodium and 29 grams (0.145 gram atom) of mercury. The reaction became very vigorous upon said addition, with the temperature rising to about 45° C. The reaction mixture was periodically cooled to 40° C. for about one hour, after which the mixture was warmed to reflux for an additional 2 hours. The product resulting from said reaction was identified as 5-chloro-2-thienylsodium.

Such identification was effected, as in the previous example, by carbonating and acidifying to yield 212 grams (65% yield) of a product which was identified as 5-chloro-2-thiophenecarboxylic acid.

*Example 9*

A mixture of 236 grams (2 moles) of 2-chlorothiophene and 200 milliliters of anhydrous diethyl ether was added rapidly to freshly prepared sodium amalgam sand containing 50 grams (2.17 grams atoms) of sodium and 29 grams (0.145 gram atom) of mercury. The reaction became very vigorous upon said addition, with the temperature rising to about 45° C. The reaction mixture was periodically cooled to 40° C. for about one hour, after which the mixture was warmed to reflux for an additional 2 hours. The product resulting from said reaction was identified as 5-chloro-2-thienylsodium.

Such identification was effected, as in the previous example, by carbonating and acidifying to yield 166 grams (50% yield) of a product which was identified as 5-chloro-2-thiophenecarboxylic acid.

An examination of the yields of 5-chloro-2-thiophenecarboxylic acid obtained in Examples 6–9, where the reaction was carried out under substantially identical conditions, with the exception of the amount of ether employed, shows that the quantity of solvent present directly affects the yield of acid obtained which, in turn, is indicative of the amount of desired halothienylsodium compound obtained. This phenomenon will be readily apparent from the following table:

| Example | Ml. of Solvent per Mole of 2-chlorothiophene | Per cent Yield of 5-chloro-2-thiophenecarboxylic Acid |
| --- | --- | --- |
| 6 | 1,000 | 92 |
| 7 | 500 | 74 |
| 8 | 250 | 65 |
| 9 | 100 | 50 |

It will be seen from an examination of the above data that the yield of 5-chloro-2-thiophenecarboxylic acid rapidly increases as the quantity of ether is increased. Accordingly, the quantity of solvent used in the present process will generally be greater than about 200 milliliters per mole of halogenated thiophene and usually will be between about 200 and 1500 milliliters per mole of halogenated thiophene.

I claim:

1. A method for metalating a thiophene compound having the general formula:

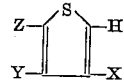

where at least one of the substituents X, Y, and Z is a halogen atom and the two remaining substituents are selected from the group consisting of alkyl, hydrogen, and halogen substituents, which comprises contacting said compound with sodium in the presence of an ether, said ether having a carbon to oxygen ratio not greater than 4 to 1, and replacing a nuclear hydrogen atom of said compound with sodium by maintaining the resulting reaction mixture under an inert atmosphere, thereby producing a halothienylsodium.

2. A method for metalating a thiophene compound having the general formula:

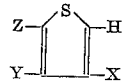

where at least one of the substituents X, Y, and Z is a halogen atom and the two remaining substituents are selected from the group consisting of alkyl, hydrogen, and halogen substituents, which comprises contacting said compound with sodium in the presence of an ether, said ether having a carbon to oxygen ratio not greater than 4 to 1, and replacing a nuclear hydrogen atom of said compound with sodium by maintaining the resulting reaction mixture under an inert atmosphere and at a temperature between about −10° C. and about 50° C., thereby producing a halothienylsodium.

3. A method for metalating a thiophene compound having the general formula:

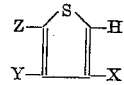

where at least one of the substituents X, Y, and Z is a halogen atom and the two remaining substituents are selected from the group consisting of alkyl, hydrogen, and halogen substituents, which comprises contacting said compound with sodium in the presence of an ether, said ether having a carbon to oxygen ratio not greater than 4 to 1, and replacing a nuclear hydrogen atom of said compound with sodium by maintaining the resulting reaction mixture under an inert atmosphere and at a temperature between about 20° C. and about 40° C., thereby producing a halothienylsodium.

4. A method for metalating a thiophene compound having the general formula:

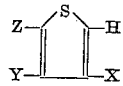

where at least one of the substituents X, Y, and Z is a halogen atom and the two remaining substituents are selected from the group consisting of alkyl, hydrogen, and halogen substituents, which comprises contacting said compound with sodium in the presence of diethyl ether, and replacing a nuclear hydrogen atom of said compound with sodium by maintaining the resulting reaction mixture under an inert atmosphere and at a temperature between about 20° C. and about 40° C., thereby producing a halothienylsodium.

5. A method for metalating a thiophene compound having the general formula:

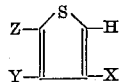

where at least one of the substituents X, Y, and Z is a halogen atom and the two remaining substituents are selected from the group consisting of alkyl, hydrogen, and halogen substituents, which comprises contacting said compound with sodium in the presence of diethyl ether, maintaining the resulting reaction mixture under an inert atmosphere and at a temperature between about 20° C. and about 40° C., thereby effecting replacement of a nuclear hydrogen atom of said compound with sodium to yield, as the resulting product, a halothienylsodium.

6. A method for metalating a thiophene compound having the general formula:

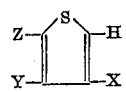

where at least one of the substituents X, Y, and Z is a halogen atom and the two remaining substituents are selected from the group consisting of alkyl, hydrogen, and halogen substituents, which comprises contacting said compound with sodium in the presence of at least about 200 milliliters of an ether per mole of said compound, said ether having a carbon to oxygen ratio not greater than 4 to 1, and replacing a nuclear hydrogen atom of said compound with sodium by maintaining the resulting reaction mixture under an inert atmosphere and at a temperature between about −10° C. and about 50° C., thereby producing a halothienylsodium.

7. A method for metalating a thiophene containing at least one alpha hydrogen atom and having at least one of the other nuclear hydrogen atoms replaced by halogen, which comprises contacting said compound with sodium in the presence of an ether, said ether having a carbon to oxygen ratio not greater than 4 to 1, and replacing a nuclear hydrogen atom of said compound with sodium by maintaining the resulting reaction mixture under an inert atmosphere, thereby producing a halothienylsodium.

8. A method for metalating a thiophene containing at least one alpha hydrogen atom and having at least one of the other nuclear hydrogen atoms replaced by chlorine, which comprises contacting said compound with sodium in the presence of an ether, said ether having a carbon to oxygen ratio not greater than 4 to 1, and replacing a nuclear hydrogen atom of said compound with sodium by maintaining the resulting reaction mixture under an inert atmosphere, thereby producing a chlorothienylsodium.

9. A method for metalating a thiophene containing at least one alpha hydrogen atom and having at least one of the other nuclear hydrogen atoms replaced by iodine, which comprises contacting said compound with sodium in the presence of an ether, said ether having a carbon to oxygen ratio not greater than 4 to 1, and replacing a nuclear hydrogen atom of said compound with sodium by maintaining the resulting reaction mixture under an inert atmosphere, thereby producing an iodothienylsodium.

10. A method for metalating a thiophene containing at least one alpha hydrogen atom and having at least one of the other nuclear hydrogen atoms replaced by bromine, which comprises contacting said compound with sodium in the presence of an ether, said ether having a carbon to oxygen ratio not greater than 4 to 1, and replacing a nuclear hydrogen atom of said compound with sodium by maintaining the resulting reaction mixture under an inert atmosphere, thereby producing a bromothienylsodium.

11. A method for metalating a monohalothiophene, which comprises contacting said compound with sodium in the presence of an ether, said ether having a carbon to oxygen ratio not greater than 4 to 1, and replacing a nuclear hydrogen atom of said compound with sodium by maintaining the resulting reaction mixture under an inert atmosphere, thereby producing a halothienylsodium.

12. A method for metalating monochlorothiophene, which comprises contacting said compound with sodium in the presence of an ether, said ether having a carbon to oxygen ratio not greater than 4 to 1, and replacing a nuclear hydrogen atom of said compound with sodium by maintaining the resulting reaction mixture under an inert atmosphere, thereby producing chlorothienylsodium.

13. A method for metalating monoiodothiophene, which comprises contacting said compound with sodium in the presence of an ether, said ether having a carbon to oxygen ratio not greater than 4 to 1, and replacing a nuclear hydrogen atom of said compound with sodium by maintaining the resulting reaction mixture under an inert atmosphere, thereby producing iodothienylsodium.

14. A method for metalating monobromothiophene, which comprises contacting said compound with sodium in the presence of an ether, said ether having a carbon to oxygen ratio not greater than 4 to 1, and replacing a nuclear hydrogen atom of said compound with sodium by maintaining the resulting reaction mixture under an inert atmosphere, thereby producing bromothienylsodium.

15. A method for metalating a monohalothiophene, which comprises contacting said compound with sodium in the presence of an ether, said ether having a carbon to oxygen ratio not greater than 4 to 1, and replacing a nuclear hydrogen atom of said compound with sodium by maintaining the resulting reaction mixture under an inert atmosphere and at a temperature between about −10° C. and about 50° C., thereby producing a halothienylsodium.

16. A method for metalating a monohalothiophene, which comprises contacting said compound with sodium in the presence of an ether, said ether having a carbon to oxygen ratio not greater than 4 to 1, and replacing a nuclear hydrogen atom of said compound with sodium by maintaining the resulting reaction mixture under an inert atmosphere and at a temperature between about 20° C. and about 40° C., thereby producing a halothienylsodium.

17. A method for metalating a thiophene containing at least one alpha hydrogen atom and having at least one of the other nuclear hydrogen atoms replaced by halogen, which comprises contacting said compound with sodium in the presence of at least about 200 milliliters of an ether per mole of said compound, said ether having a carbon to oxygen ratio not greater than 4 to 1, and replacing a nuclear hydrogen atom of said compound with sodium by maintaining the resulting reaction mixture under an inert atmosphere, thereby producing a halothienylsodium.

18. As a new composition of matter, halothienylsodium.

19. As a new composition of matter, chlorothienylsodium.

20. As a new composition of matter, bromothienylsodium.

21. As a new composition of matter, iodothienylsodium.

22. As a new composition of matter, 5-chloro-2-thienylsodium.

23. As a new composition of matter, 5-bromo-2-thienylsodium.

24. As a new composition of matter, 5-iodo-2-thienylsodium.

25. A method for metalating a monohalothiophene, which comprises contacting said compound with sodium in the presence of diethyl ether and replacing a nuclear hydrogen atom of said compound with sodium by maintaining the resulting reaction mixture under an inert atmosphere, thereby producing a halothienylsodium.

JOHN W. SCHICK.

REFERENCES CITED

The following references are of record in the file of this patent:

Steinkopf, "Die Chemie des Thiophens," p. 32, Edwards Lithoprint, 1944 (1941).
Schorigin, Ber., 43 1942 (1910).
Chemical Abstracts, 39:3267–7 (1945).
Chemical Abstracts, 36:5802–5 (1942).
Chemical Abstracts, 34:6603–2 (1940).

Certificate of Correction

Patent No. 2,492,661

December 27, 1949

JOHN W. SCHICK

It is hereby certified that errors appear in the printed specification of the above numbered patent requiring correction as follows:

Column 3, line 9, after "iodothiophene;" insert *2-chloro-3-iodothiophene;*; column 6, line 47, for the syllable "thiopene" read *thiophene*; column 9, lines 5 to 7, inclusive, strike out "and at a temperature between about 20° C. and about 40° C."; line 19, after the word and comma "ether," insert *and replacing a nuclear hydrogen atom of said compound with sodium by*; lines 22 to 25, inclusive, strike out "effecting replacement of a nuclear hydrogen atom of said compound with sodium to yield, as the resulting product," and insert instead *producing*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*